United States Patent [19]
Lubin et al.

[11] Patent Number: 6,075,884
[45] Date of Patent: Jun. 13, 2000

[54] METHOD AND APPARATUS FOR TRAINING A NEURAL NETWORK TO LEARN AND USE FIDELITY METRIC AS A CONTROL MECHANISM

[75] Inventors: Jeffrey Lubin, So. Orange, N.J.; Heidi A. Peterson, New York, N.Y.; Clay D. Spence, Princeton Junction; Aalbert de Vries, Lawrenceville, both of N.J.

[73] Assignee: Sarnoff Corporation, Princeton, N.J.

[21] Appl. No.: 08/828,161

[22] Filed: Mar. 28, 1997

Related U.S. Application Data

[60] Provisional application No. 60/014,266, Mar. 29, 1996, and provisional application No. 60/014,687, Apr. 2, 1996.

[51] Int. Cl.[7] .............................. G06K 9/36; G06T 1/40
[52] U.S. Cl. ............................................ 382/156; 382/239
[58] Field of Search .................... 382/159, 260, 382/156, 218, 238, 239; 395/21; 706/15, 20, 22, 23; 348/404, 845.1; 358/430

[56] References Cited

U.S. PATENT DOCUMENTS

| | | | |
|---|---|---|---|
| 5,107,347 | 4/1992 | Hashimoto et al. | 358/448 |
| 5,309,525 | 5/1994 | Shimomura et al. | 382/50 |
| 5,394,483 | 2/1995 | Daly | 382/34 |
| 5,491,776 | 2/1996 | Dangi | 395/11 |
| 5,495,542 | 2/1996 | Shimomura et al. | 382/254 |
| 5,517,581 | 5/1996 | Johnston et al. | 382/232 |
| 5,694,491 | 12/1997 | Brill et al. | 382/260 |
| 5,719,966 | 2/1998 | Brill et al. | 382/260 |
| 5,758,027 | 5/1998 | Meyers et al. | 395/21 |
| 5,909,675 | 6/1999 | Chiodini | 706/20 |

*Primary Examiner*—Andrew W. Johns
*Attorney, Agent, or Firm*—William J. Burke

[57] ABSTRACT

A signal processing apparatus and concomitant method for learning and using fidelity metric as a control mechanism and to process large quantities of fidelity metrics from a visual discrimination measure (VDM) to a manageable subjective image quality ratings. The signal processing apparatus incorporates a VDM and a neural network. The VDM receives input image sequences and generates fidelity metrics, which are received by a neural network. The neural network is trained to learn and use the fidelity metrics as a control mechanism, e.g., to control a video encoder.

19 Claims, 7 Drawing Sheets

METHOD AND APPARATUS FOR TRAINING A NEURAL NETWORK TO LEARN AND USE FIDELITY METRIC AS A CONTROL MECHANISM

This application claims the benefit of U.S. Provisional Applications Ser. No. 60/014,266 filed Mar. 29, 1996 and Ser. No. 60/014,687 filed Apr. 2, 1996.

The present invention relates generally to the field of neural information processing and, more particularly, to an apparatus and concomitant method for learning and using fidelity metric as a control mechanism.

BACKGROUND OF THE INVENTION

Designers of imaging systems often assess the performance of their designs in terms of physical parameters such as contrast, resolution and bit-rate efficiency in compression/decompression (codec) processes. While these parameters can be easily measured, they may not be accurate gauges for evaluating performance. The reason is that end users of imaging systems are generally more concerned with the subjective visual performance such as the visibility of artifacts or distortions and in some cases, the enhancement of these image features which may reveal information such as the existence of a tumor in an image, e.g., a MRI (Magnetic Resonance Imaging) image or a CAT (Computer-Assisted Tomography) scan image.

Over the years, various human visual performance methods (perceptual metric generator or visual discrimination measure (VDM)) have been used to improve imaging system design. These visual discrimination measures can be broadly classified as "spatial" or "spatiotemporal". Examples of spatial visual discrimination measures include the Carlson and Cohen generator and the square root integral (SQRI) generator. Examples of a spatiotemporal visual discrimination measures (VDM) are disclosed in U.S. patent application Ser. No. 08/668,015, filed Jun. 17, 1996 and "Method And Apparatus For Assessing The Visibility Of Differences Between Two Image Sequences" filed on Mar. 28, 1997 with Ser. No. 08/829,516, now U.S. Pat. No. 5,694,491.

The spatiotemporal VDMs disclosed in the above-referenced patent applications receive a pair of image sequences as input, and then produce an estimate of the discriminability between the sequences, for each local region in space and time. In the Sarnoff VDM, this set of discriminability estimates (fidelity metric, perceptual metric or quality metric) is generated in units of Just Noticeable Differences (JNDs), as a sequence of maps, wherein each pixel value in each frame of the JND Map Sequence is a discriminability estimate for corresponding spaciotemporal regions of the two input sequences.

For some applications, such as quality metering of a digital video channel, this large volume of output data is more useful if it can be condensed into a single number or a small set of numbers for each pair of input image sequences. Current approaches to this condensation process involve the computation of simple image statistics such as mean or maximum, in an attempt to correlate a single JND-based number to a number derived from subjective quality experiments in which human observers are asked to rate the quality of each sequence with a single number or adjectival rating. However, these statistics-based approaches do not capture some effects, for example, in which high JNDs within specific objects in the center of the frame (e.g., a face) have a greater impact on subjective image quality ratings than high JNDs in less significant objects, in less significant locations.

Furthermore, since the content of the image sequences may change rapidly in some applications, it would be imprecise to use a rigid rule for evaluating subjective image quality ratings.

Therefore, a need exists in the art for training an apparatus to learn and use fidelity metric as a control mechanism and to quickly and accurately process the large quantities of fidelity metrics from a VDM to a manageable subjective image quality ratings, e.g., a single numbered subjective quality ratings.

SUMMARY OF THE INVENTION

A signal processing apparatus and concomitant method for learning and using fidelity metric as a control mechanism and to process large quantities of fidelity metrics from a visual discrimination measure (VDM) to manageable subjective image quality ratings. The signal processing apparatus incorporates a VDM and a neural network. The VDM receives input image sequences and generates fidelity metrics, which are received by a neural network. The neural network is trained to learn and use the fidelity metrics as a control mechanism, e.g., to control an image (video) or audio encoder. Furthermore, the neural network is trained to classify the fidelity metrics from the visual discrimination measure into a manageable subjective image quality ratings.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
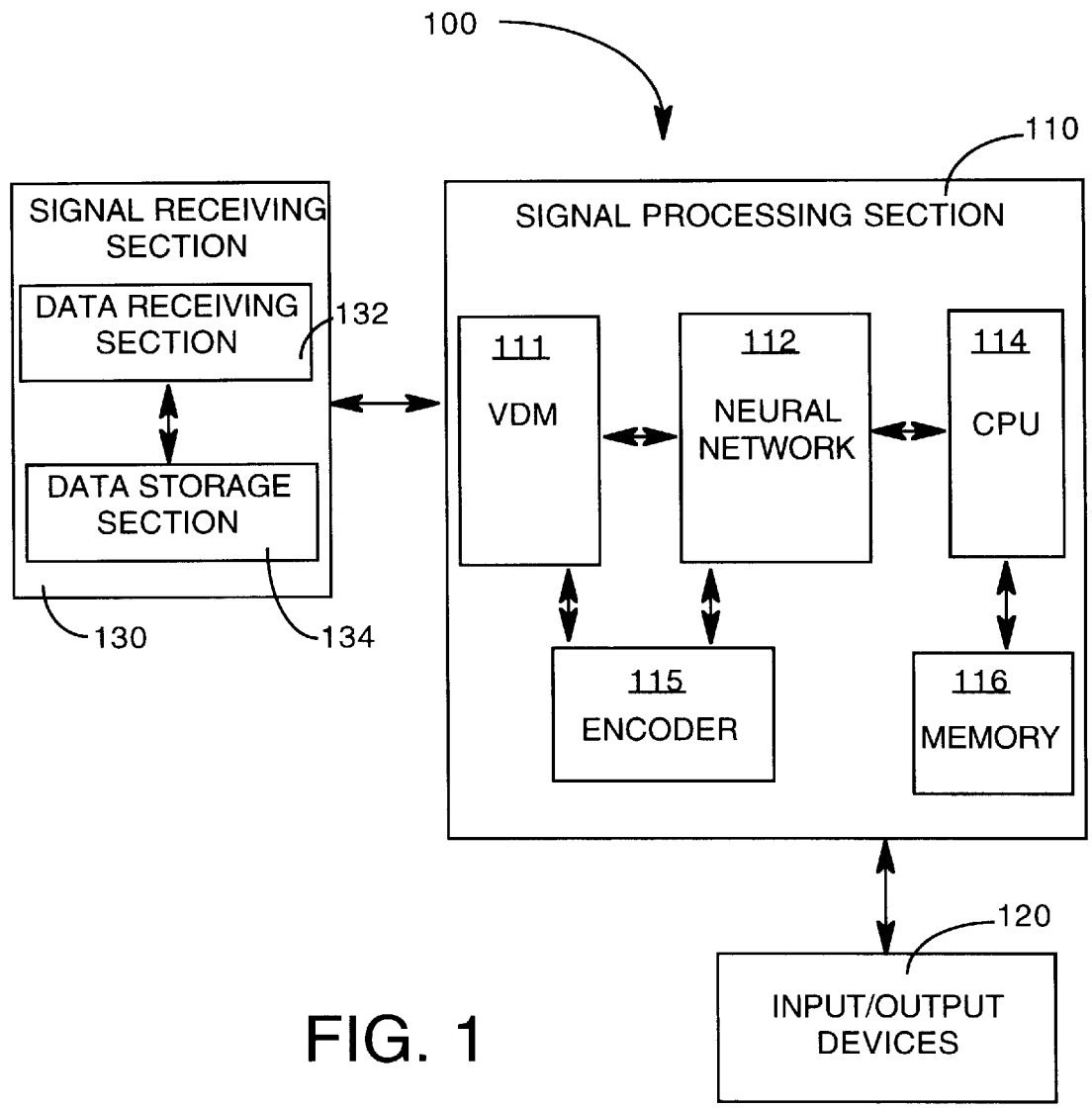
FIG. 1 is a block diagram of a signal processing system that incorporates a neural network that embodies the teachings of the present invention.

FIG. 1 depicts a signal processing system 100 that utilizes the present invention. The signal processing system consists of a signal receiving section 130, a signal processing section 110, and input/output devices 120.

Signal receiving section 130 serves to receive input data signals, such as images from, including by not limited to, satellite or cable transmission, computers, video camera, aerial imagery or medical imaging devices. Signal receiving section 130 includes a data receiving section 132 and a data storage section 134. Data receiving section 132 may include a number of devices such as a modem and an analog-todigital converter. A modem is a well-known device that comprises a modulator and a demodulator for sending and receiving binary data over a telephone line, while an analog-to-digital converter converts analog signals into a digital form. Hence, signal receiving section 130 may receive input signals "on-line" and, if necessary, convert them to a digital form from a number of devices such as a computer, a camera, a video player/decoder or various imaging devices, e.g., medical devices. In fact, the input signals is not limited to images and may comprise any data that has a "natural scale", e.g., drug discovery data (molecular data in general) and/or other time-varying signals such as audio signals from a microphone or recorded media, or financial signals, e.g., daily stock prices. Thus, although the present invention is described below with regard to images, it should be understood that the present invention can be applied to other input signals as discussed above.

The data storage section 134 serves to store input signals received by data receiving section 132. Data storage section 134 may incorporate a number of devices such as a disk drive, semiconductor memory or other storage media. These storage devices provide a method for applying a delay to the input signals or to simply store the input signals for subsequent processing.

In the preferred embodiment, the signal processing section 110 comprises a general purpose computer having at least one neural network 112, at least one central processing unit (CPU) 114, and a memory 116 for processing images. The neural network 112 can be a physical device constructed from various filters and/or processors which is coupled to the CPU through a communication channel. Alternatively, the neural network can be represented by a software implementation residing in the memory of the signal processing section.

The general purpose computer may optionally incorporate a VDM 111 (a perceptual metric generator) and a video encoder 115. The VDM serves to receive a pair of image sequences as input, and then produces an estimate of the discriminability between the sequences (fidelity metric), for each local region in space and time. Depending on a specific application, the fidelity metric can be forwarded directly to the neural network 112 for further processing and/or to the video encoder 115 to control the encoding process. Similarly, the VDM 111 and video encoder 115 can be physical devices constructed from various filters and/or processors which are coupled to the CPU through a communication channel. Alternatively, the VDM and video encoder can also be represented by software implementations residing in the memory of the signal processing section 110.

FIG. 1 also illustrates the unique architecture where the VDM is positioned between incoming data (image) sequences and the neural network 112. This particular configuration illustrates the concept of employing a VDM to generate fidelity metric (e.g., a spatio-temporal JND map) as inputs for the neural network 112, which in turn generates a control signal. In sum, the neural network is used to perform two functions: 1) process the large quantities of fidelity metrics from the VDM into manageable subjective fidelity ratings, e.g., a single numbered subjective quality or fidelity ratings, and 2) apply fidelity metric as a control mechanism, e.g., to control the coding processes of image encoder 115.

A spatio-temporal JND map, i.e., a two-dimensional representation of image fidelity, that can be used as a quantitative perceptual difference measure for encoding video is disclosed in U.S. patent application Ser. No. 08/668,015, filed Jun. 17, 1996, now U.S. Pat. No. 5,694,491, herein incorporated by reference. However, other quantitative perceptual difference measures include those disclosed in S. Daly, "The Visible Differences Predictor: An algorithm for the Assessment of Image Quality", in A. B. Watson (ed.), Digital Images and Human Vision, MIT Press, 1993, pp. 179–206 and S. Daly, "Quantitative Performance Assessment of an Algorithm for the Determination of Image Quality", Society of Information Display International Symposium Digest of Technical Papers, Vol. 24, (1993), pp. 317–320. As such, although the present invention is described below with reference to JND map or values, it should be understood that other perceptual difference measures can be used with the present invention.

The signal processing section 110 is also coupled to a plurality of input and output devices 120 such as a keyboard, a mouse, a video monitor, a video decoder via a channel or storage devices, including but not limited to, a hard disk drive, a floppy drive or a compact disk drive. The input devices serve to provide inputs (e.g., data, commands and software applications) to the signal processing section for processing the input images, while the output devices serve to display or record the results.

Neural network has been developed to solve problems ranging from natural language understanding to visual processing. A neural network is composed of neurons (also known as nodes, units or perceptrons) and connections between the nodes. The strength of each connection is expressed by a numerical value called a weight, which can be modified. The activation of a given node is based on the activations of the nodes that have connections directed at that node and the weights on those connections.

In contrast to conventional computers, which are programmed to perform specific tasks, most neural networks do not follow rigidly programmed rules and are generally taught or trained. Generally, a feed-forward neural network can be implemented as functions y(f,w) of a vector f of inputs and a weight or parameter vector w. The weight vector is modified such that the neural network optimally estimates some quantity that depends on f. The process of adjusting w is commonly referred to as training, where the methods for training are referred to as training algorithms. Most neural network trainings involve the use of an error function. The weight vector is adjusted so as to minimize the sum of average of the error function on a set of training samples. A penalty term is generally applied to the error to restrict the weight vector in some manner that is thought desirable. Given the resulting objective function, various training methods are used to minimized it or involve the use of some form of gradient descent.

Figure 2:
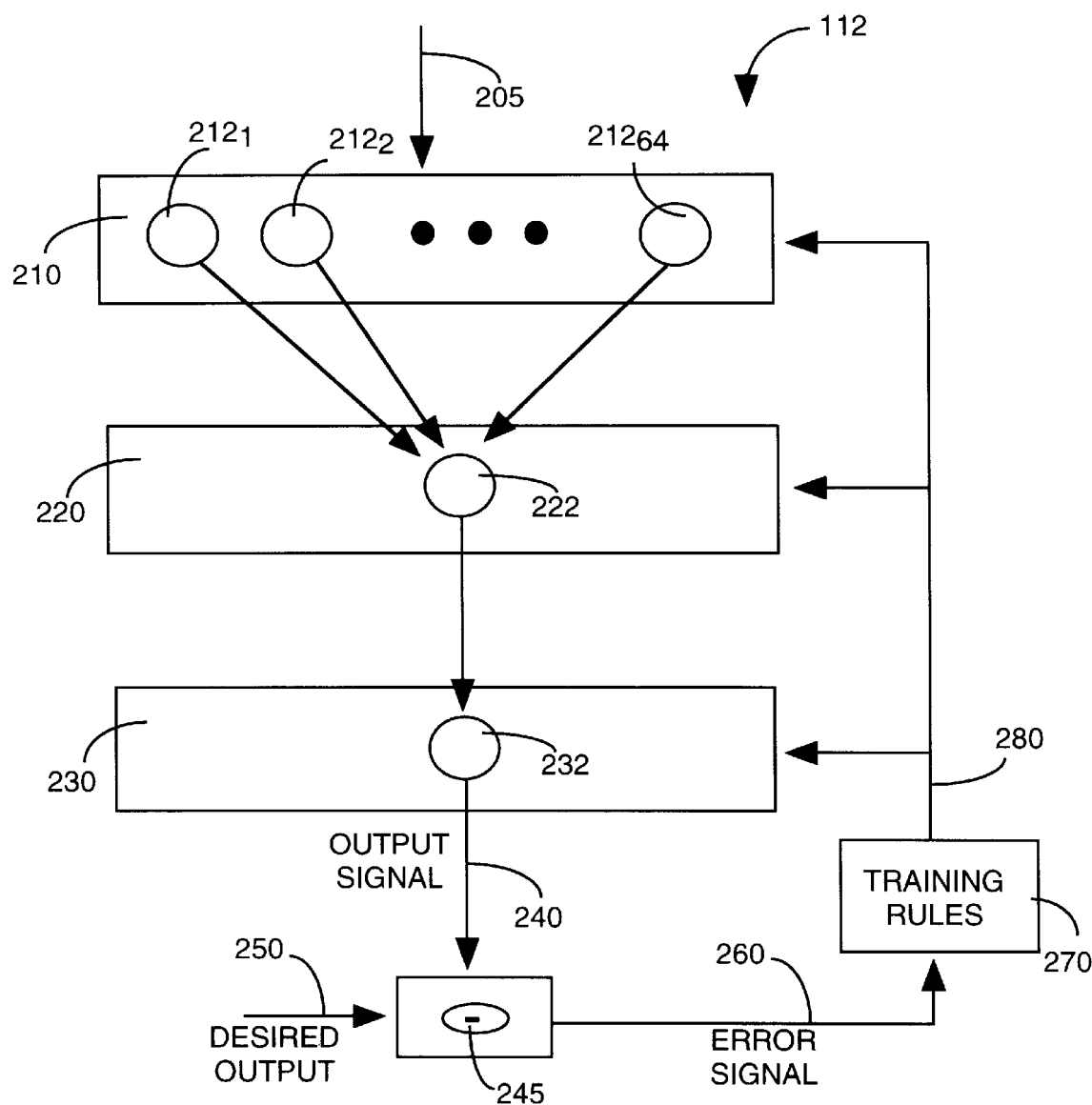
FIG. 2 illustrates the structure of a neural network.

FIG. 2 illustrates the structure of the neural network 112 in a preferred embodiment. Each neural network 112 includes at least an input layer 210, an output layer 230 and optional intermediate layers (also known as hidden layers) 220. An input signal 205, which is a fidelity metric, is applied as input to the neural network. In the preferred embodiment, the fidelity metric is a JND map.

Depending on a particular application, the structure of the neural network 112 as shown in FIG. 2 can be modified as the neural network undergoes training. It is certainly possible to train a neural network to extract relevant features from an input signal, but all the values within the JND map carry important contrast information pertaining to an estimate of the discriminability between the sequences. As such, extraction is not necessary and the entire JND map serves as inputs to the neural network 112. Although it is possible to feed the entire JND map as inputs to the neural network all at once, it is often more efficient for the neural network to take a rectangular block of JND values each time. Setting the input block size to be 8×8, i.e., a 64 component input vector is received by 64 nodes $212_1$–$212_{64}$ in the input layer 210 of the neural network. These input layer nodes are then feed to a hidden node 222 which feeds an output node 232. However, it should be understood that the input block size is not limited to 8×8 and other block sizes can also be employed.

Those skilled in the art will realize that the structure of the neural network is further refined during training. As such, the output signal 240 is compared with a desired output 250 via subtractor 245. In turn the training method 270 utilizes the error signal 260 to train the neural network.

Training for the neural network in this architecture can be accomplished with standard back propagation techniques, in which the error signal is based on the sum of the squared differences between predicted ratings and ratings observed from human subjects in standard subjective rating tasks, across a range of different input image sequences at different quality levels. Namely, error back-propagation is a supervised learning process through which a neural network learns optimal weights. Error back-propagation compares the responses of the output nodes to a desired response, and adjusts the weights in the network so that if the same input is presented to the network again, the network's response will be closer to the desired response.

To illustrate, the output values of all nodes $n_h$ 212 in the input layer 210 are distributed as an input value to each of the node $n_i$ 222 in the intermediate layer 220. The output value of each of the nodes in the intermediate layer 220 is distributed as an input value to every node $n_j$ 232 in the output layer 230. Each node $n_j$ 232 produces a value which is the total sum net of output values $O_i$ of a node $n_i$ coupled to the output node by a coupling weight $W_{ji}$, transformed by a predetermined function f, where f is a sigmoidal function, e.g., typically $1(1+e^{31\ x})$. This same concept applies to the intermediate node $n_i$ 222 with respect to input node $n_h$ 212. In other words, when the values within a pattern p are provided as an input value to each node $n_h$ 212, an output value $O_{pi}$ and $O_{pj}$ for each node $n_i$ 222 and $n_j$ 232 respectively, can be expressed by the following formulas:

$$O_{pi} = f_i\left(\sum_h w_{ih} \cdot O_{ph}\right) \quad (1)$$

$$O_{pj} = f_i\left(\sum_h w_{ji} \cdot O_{pi}\right)$$

Hence, the network acquires output value $O_{pj}$ of the output node $n_j$ 232 of the output layer 230 by sequentially computing the output values of the input $n_j$ 232, each corresponding to a node from the input layer 212 towards the output layer 230.

The process of learning in accordance with error back-propagation consists of updating coupling weights $W_{ji}$ and $W_{ih}$, so that the total sum $E_p$ of the square errors between the output value $O_{pj}$ of each node of the output layer 230 on applying the input pattern p and the desired output $t_{pj}$, is minimized. Hence, the total network error E for the input pattern p is defined by:

$$E_p = \frac{1}{2}\sum_j (t_{pj} - O_{pj})^2 \quad (2)$$

This algorithm is sequentially applied from the output layer 230 back toward the input layer 210. The network error with respect to any weight, e.g., weight $W_{ji}$, is given by the gradient $\partial E_p/\partial W_{ji}$ of the total network error $E_p$ with respect to a change in that weight. Hence, the error $\delta_j$, for each output node $n_j$ 232 can be determined as a function of the corresponding actual value $O_{pj}$ and target value $t_{pj}$ and the difference therebetween for that node, as follows:

$$\delta_j = O_{pj}(1-O_{pj})(O_{pj}-t_{pj}) \quad (3)$$

and for an intermediate node $n_i$ 222, as follows:

$$\delta_i = O_{pi}(1 - O_{pi})\sum_j (\delta_j w_{ji}) \quad \text{for all } j. \quad (4)$$

It should be noted that equations (3) and (4) are true as long as function f is used as discussed above. However, those skilled in the art will realize that if a different function f is employed then equations (3) and (4) will change accordingly. After the neural errors are determined, these errors are propagated, via leads 280, back toward the network input nodes.

The coupling weights of both the output layer 230 and the intermediate layer 220 are adjusted according to the following learning rules for $n_j$ 232:

$$\Delta w_{ji}(n+1) = -\eta\delta_j O_{pj} + \alpha\Delta w_{ji}(n) \quad (5)$$

and for each intermediate node $n_i$ 222:

$$\Delta w_{ih}(n+1) = -\eta\delta_i O_{pi} + \alpha\Delta w_{ih}(n) \quad (6)$$

In the above formulas, $\eta$ represents the rate of learning, which is a constant, and it determines how fast the network weights converge during network training. Coefficient $\alpha$ represents a stabilization factor for reducing the error oscillations and accelerating the convergence thereof. Both coefficients $\eta$ and $\alpha$ can be empirically determined from the number of nodes, layers, input values or output values. This weight adjustment process is repeated until the patterns in the training set are exhausted or when the final error value falls below a predefined upper bound $E_{max}$. For a detailed explanation of error back-propagation in neural networks, see S. Haykin, *Neural Networks*, IEEE Press, (1994).

Additionally, training of the neural network may reveal that its structure is inadequate to handle certain types of inputs. As such, the structure of the neural network as illustrated in FIG. 2 should be deemed as a starting structure, where the number of nodes in the neural network 112 may need to be adjusted during training. For example, training may reveal that additional hidden nodes are required to improve the performance of the neural network. Furthermore, although the neural network of the present invention is trained with error back-propagation, other training methods can also be used.

Figure 3:
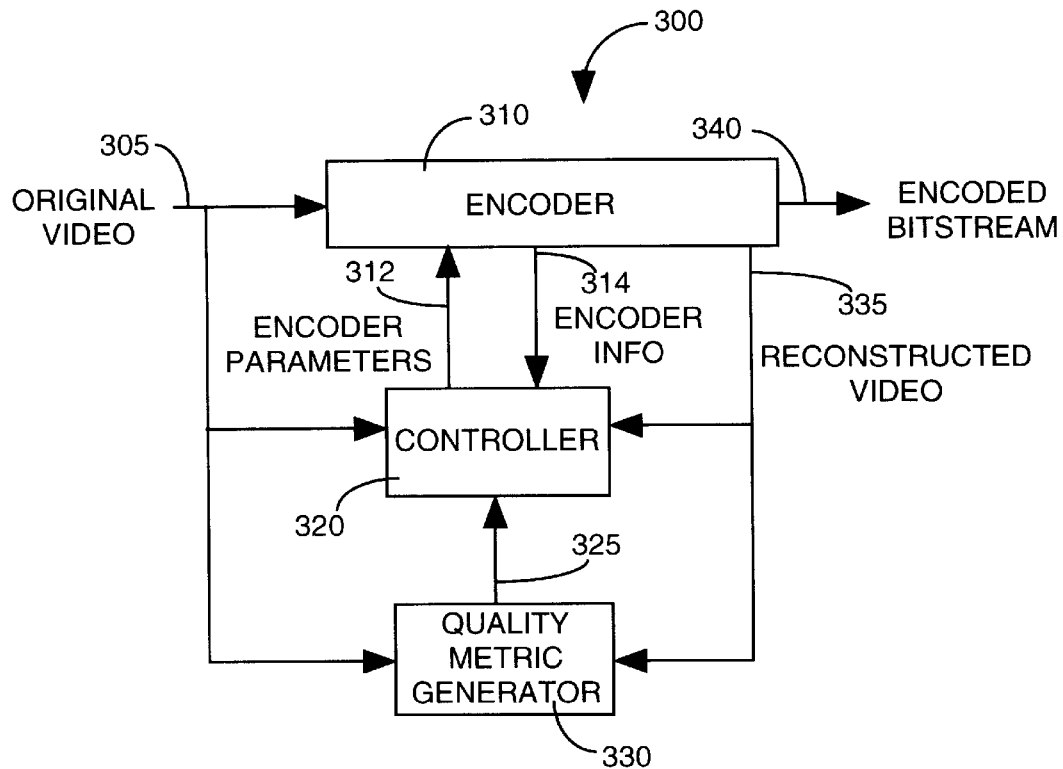
FIG. 3 illustrates a block diagram of a quality-metric-based encoding (QME) system.

FIG. 3 illustrates a block diagram of an encoding system 300 which incorporates an image encoder 310, a controller 320 and a quality metric generator 330. Encoding system 300 employs video compression methods that generally include a mechanism for controlling bit allocation to produce, for the specified bit rate, the best possible quality decoded image sequence.

During encoding of the image sequence (original video) 305, the controller considers the available information via path 314, and determines the bit allocation necessary to represent a particular part of the image. The available information may include motion vectors, transform coefficients statistics related to the input video, operational modes selected by the encoder and etc. Furthermore, such information may also include how close the actual encoded bitrate is to the desired bitrate, how full various encoder buffers are, and spatio-temporal characteristics of the original and reconstructed video sequences. The controller then adjusts the encoder parameters via path 312 in order to achieve that target bitrate/quality point.

To further improve the effectiveness of the controller, a quality metric generator 330 is incorporated in the encoding process. Such system is known as a quality-metric-based encoding (QME) system, and is the subject of a patent application entitled "Apparatus And Method For Optimizing Encoding And Performing Automated Steerable Image Compression In An Image Coding System Using A Perceptual Metric" filed on Mar. 28, 1997 with Ser. No. 08/825,474 (which is hereby incorporated by reference).

During encoding, a fidelity metric on path 325 is applied to compare the reconstructed video on path 335 to the original video on path 305 and, based on the quality measured, the controller adjusts the encoder parameters to achieve the desired quality/bitrate goal to produce an encoded bitstream on path 340. The QME system can be used in an iterative fashion until a desired bitrate/quality goal is reached.

It should be noted that the meaning of "best" in the context of a QME system can be different for different applications. The meaning of "best" is reflected by the fidelity metric used in the encoding process. For many video compression applications, the end "consumer" of the decompressed video is a human viewer. Typically, the viewer does not have any particular task at hand, but only wants the decompressed video to "look" good. In such cases, the compression method should deliver, for a particular bitrate, the decompressed video with the least perceptible distortion. For these applications the fidelity metric used in the QME system is a visual fidelity metric, and such encoder is referred to as a vision optimized encoder (VOE).

The computation of the video fidelity metric is performed during the encoding process, and, for some implementations, several iterations of encoding/quality measurement are required. However, since video fidelity metrics can be quite computationally complex, the QME system of FIG. 3 can benefit by incorporating an efficient real-time fidelity metric generator.

Figure 4:
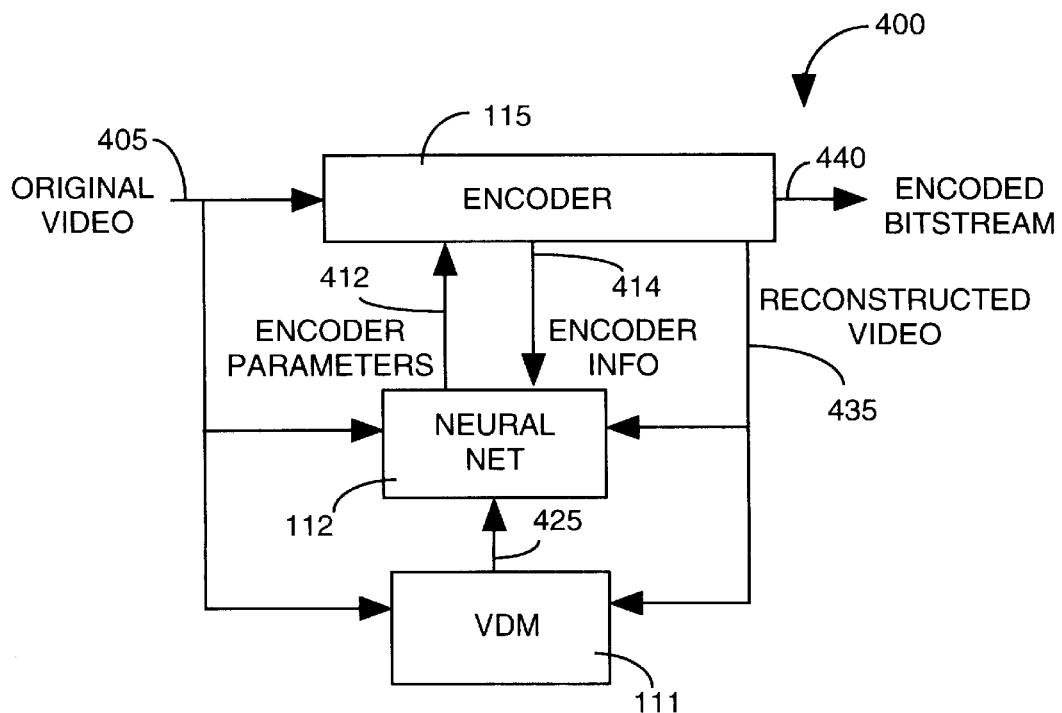
FIG. 4 illustrates a block diagram of a QME system which incorporates a neural network.

FIG. 4 illustrates a block diagram of a QME system 400 which incorporates a neural network (NN) 112 to substitute for the controller of the QME system. An QME system that includes a neural net is referred to as a NN-QME system. In fact, FIGS. 4–6 collectively illustrate three different NN-QME configurations which incorporates one or more neural network(s) (NN) to substitute for either or both, the controller and the fidelity metric generator of the QME system.

Thus, during encoding, a VDM 111 forwards a fidelity metric on path 425, which is applied to compare the reconstructed video on path 435 to the original video on path 405. Based on the quality measured, and other encoder information on path 414, the neural network 112 adjusts the encoder parameters to the encoder 115 via path 412 to achieve the desired quality/bitrate goal to produce an encoded bitstream on path 440. Again, the QME system can be used in an iterative fashion until a desired bitrate/quality goal is reached.

A neural network is a computational network with many parameters which can be adapted to approximate any (possibly non-linear) function. Neural networks are appropriately applied in situations where it is easier to collect data samples then to design a solution to address a problem. This is reflected in the present situation where a computationally efficient, accurate video fidelity metric is not readily available without incurring computational expense. Alternatively, the encoding system may instead collect a database of video sequences and the fidelity metric ratings given to these sequences by a neural network. Namely, the neural network is employed to process the fidelity metric data and, in turn, produces a simpler fidelity metric ratings in real time for the encoder. Hence, neural networks are a natural fit to the efficient video fidelity metric problem. Similarly, the mapping from a video quality measure to the optimal parameter settings for the encoder (i.e., the task for the control scheme) is unknown and likely highly non-linear.

Figure 5:
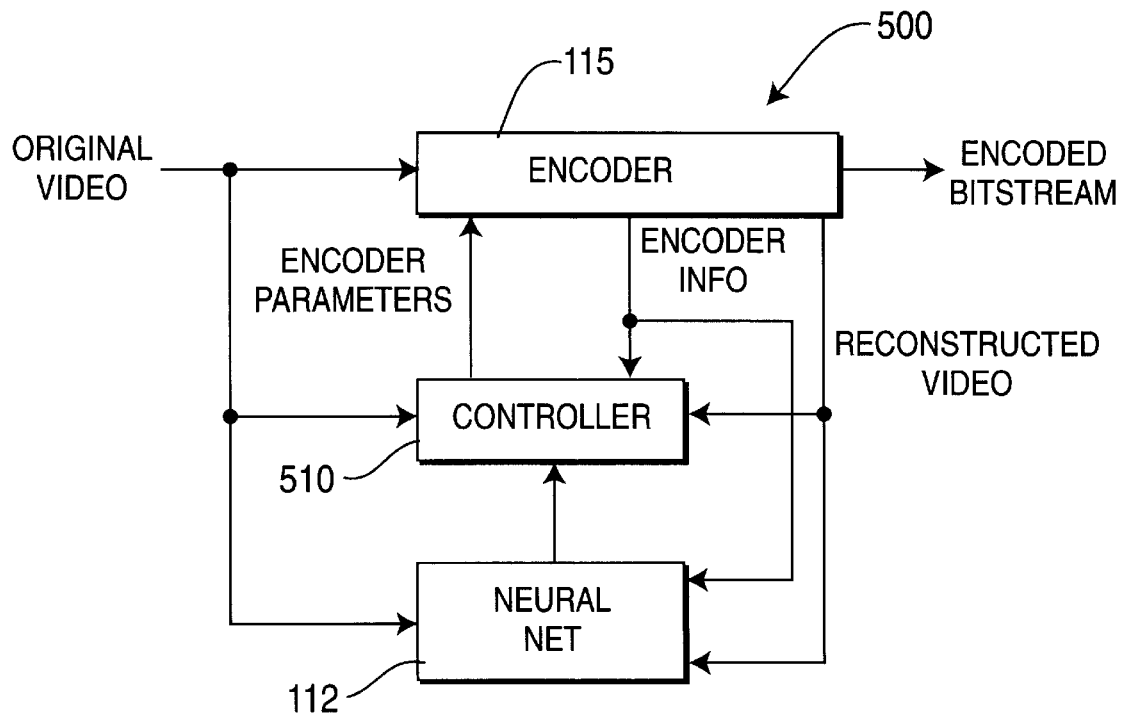
FIG. 5 illustrates a block diagram of a second embodiment of a neural network (NN-QME) system.

FIG. 5 illustrates a block diagram of a QME system 500 which incorporates a neural network (NN) 112 to substitute for the VDM of the QME system. The NN 112 forwards the fidelity metrics or a simplified fidelity metric ratings to the controller 510. An example of a simplified fidelity metric ratings is a scale from 0–4 'representing no noticeable difference, a value "0", to very noticeable difference, a value "4". The controller, using the simplified fidelity metric ratings, is able to quickly adjust the encoder parameters to the encoder 115 to effect a specific coding result.

Figure 6:
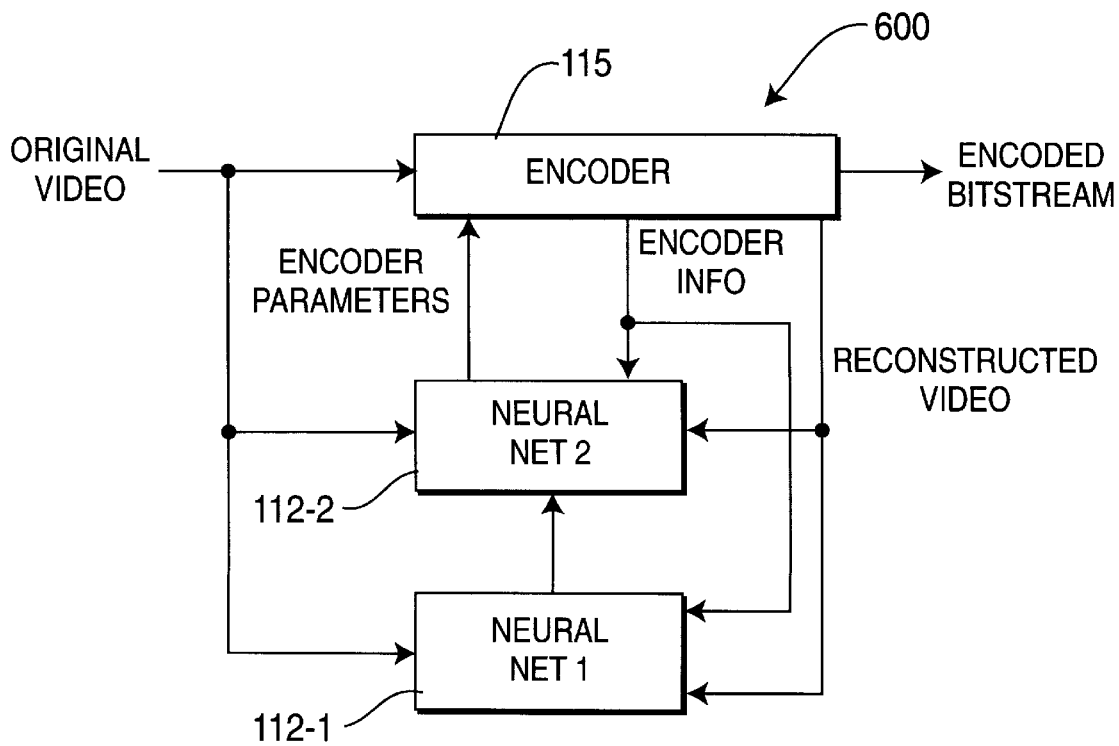
FIG. 6 illustrates a block diagram of a third embodiment of a NN-QME system.

FIG. 6 illustrates a block diagram of a QME system 600 which incorporates two neural networks (NN) 112-1 and 112-2 to substitute for the VDM and controller of the QME system. The NN 117-1 (net 1) forwards the fidelity metrics or a simplified fidelity metric ratings to the NN 112-2 (net 2). The neural network (net 2), using the simplified fidelity metric ratings, is able to quickly adjust the encoder parameters to the encoder 115 to effect a specific coding result.

Figure 7:
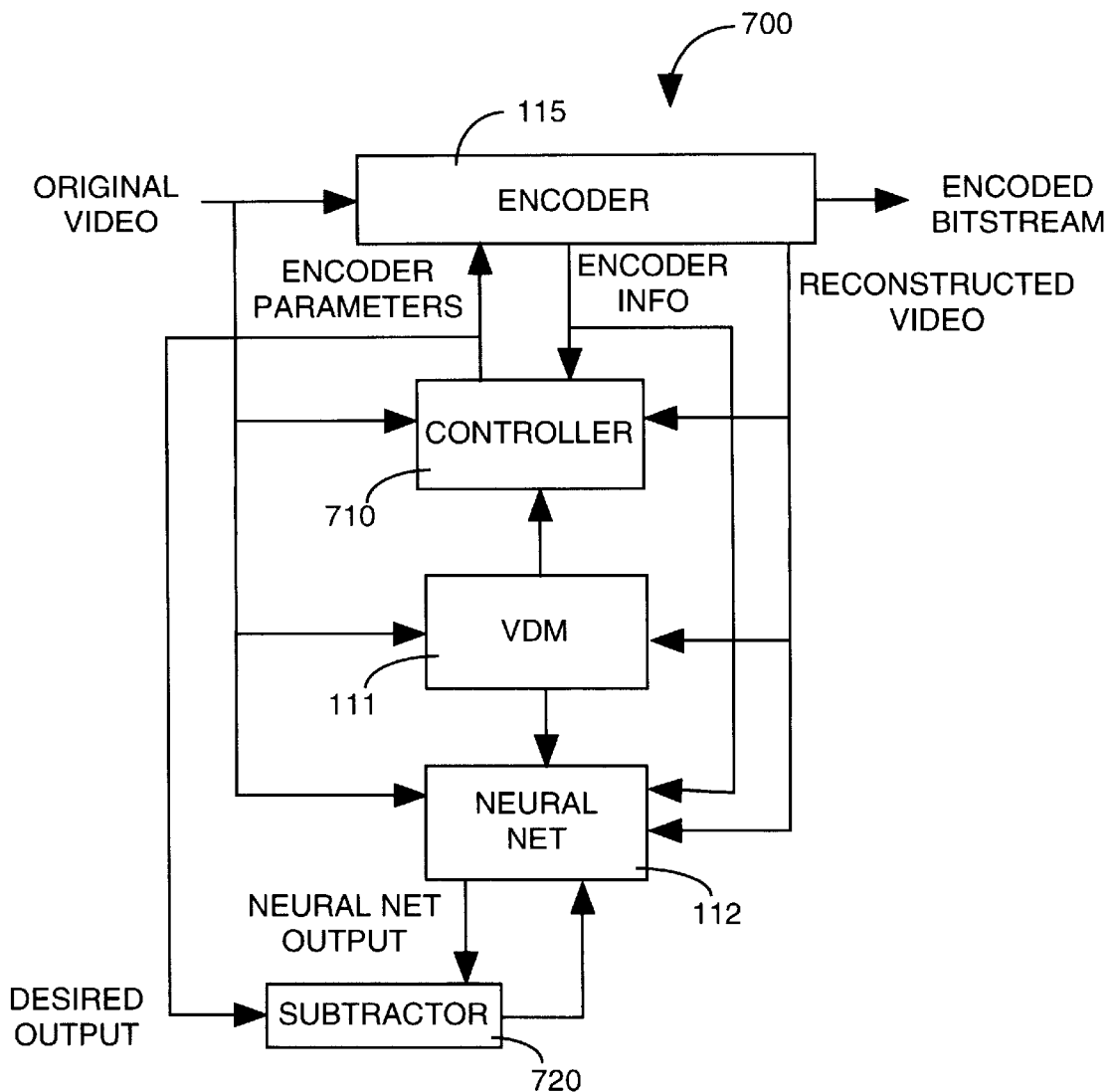
FIG. 7 illustrates a block diagram of a neural network undergoing training in a NN-QME system.
Figure 8:
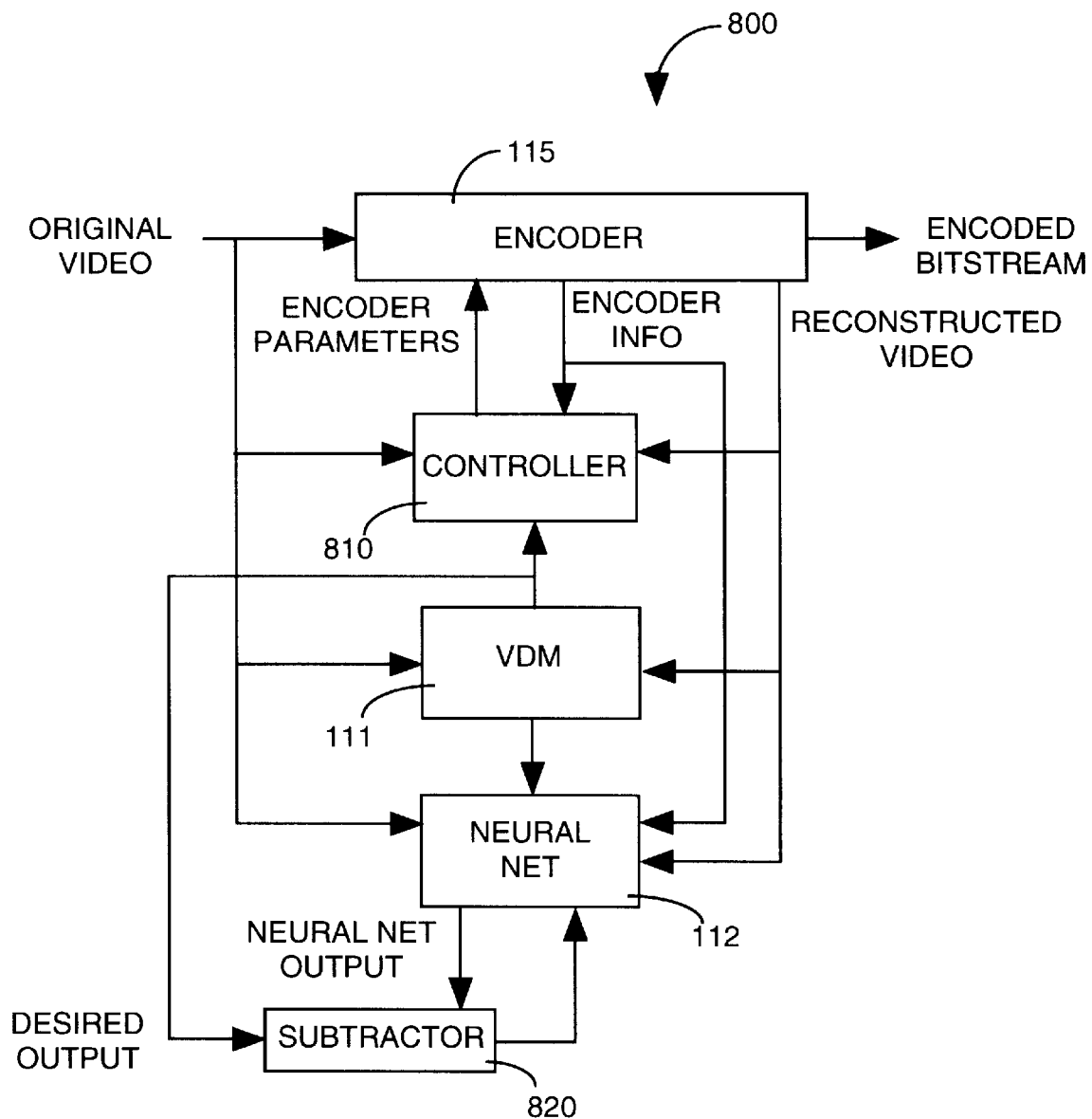
FIG. 8 illustrates a block diagram of a second embodiment where a neural network is undergoing training in a NN-QME system.

Before a NN can replace a component in the QME system to form one of the NN-QME systems shown above, the NN must undergo an adaptation phase, also known as "training" as discussed above. FIG. 7 shows the configuration of an NN-QME system 700 used for training the NN 112 which will replace the controller 710. FIG. 8 shows the configuration of an NN-QME system 800 used for training the NN 112 which will replace the quality metric generator (VDM) 111.

Since the training for a NN to replace the quality metric generator and the training for a NN to replace the controller are similar. The below discussion for training a NN to replace the quality metric generator can be followed to generate an analogous process to train a NN to replace the controller. In order to train a NN as a low complexity video quality metric generator, a large database is generated to collect the decompressed video sequences and their perceived fidelity (as calculated by an already known, possibly more complex video quality metric generator).

The encoder loop in FIG. 8 generates this database of decompressed video sequences and quality ratings. Note that the NN could alternatively be trained directly on ratings of video sequences obtained in experiments using human subjects. For each of the video sequences in the database, the NN computes a metric (labeled "NN output" in FIGS. 7 & 8), given the "current state" of its parameters. An error is generated by subtracting the NN output from the target metric (labeled "desired output" in FIGS. 7 and 8 via subtractors 720 and 820) as calculated by the known metric. Next, the NN parameters are adapted such that the error would be reduced if the video sequence (database) was presented again to the NN. This iterative process (the training phase) continues until it is no longer possible to reduce the NN output error by adaptation of its parameters. If the error is acceptably small, the NN can now serve as a computational device to measure video quality. Once the NN has been completely trained, the subtractors in FIGS. 7 and 8 are removed, and the NN is substituted for the appropriate component in the QME system, forming one of the NN-QME systems shown in FIGS. 4–6.

Furthermore, video quality and bit allocation have both global and local aspects. Distortions in the video can occur at any scale, and so all scales need to be examined. In the controller, for example, the number of bits allowed in a frame is a global quantity, which then needs to be distributed in some way across the frame. For optimal performance, the distribution of encoded bits spatio-temporally across the video sequence is usually non-uniform. To combine the global and local aspects of encoded bit distribution decisions, a coarse-to-fine set of neural networks can be used.

Figure 9:
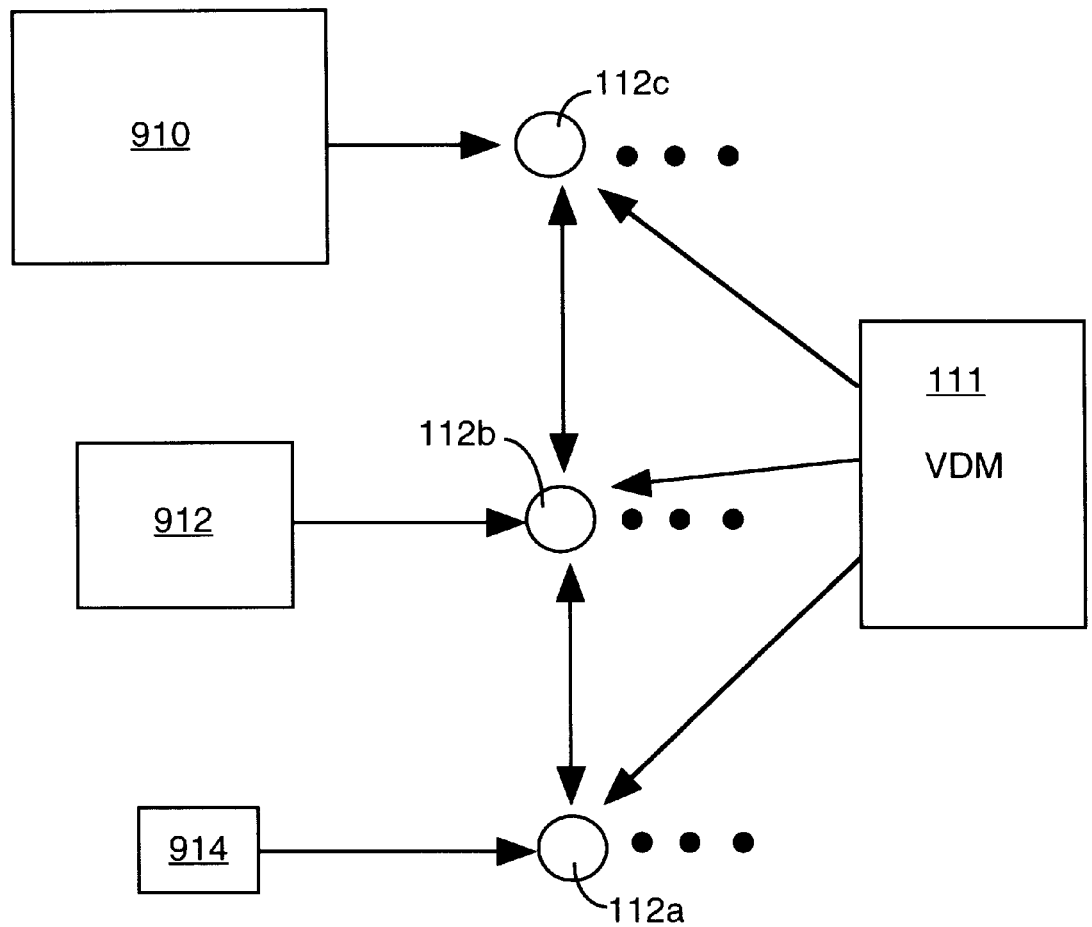
FIG. 9 illustrates a NN encoding-control system.

FIG. 9 illustrates a NN encoding-control system. The NN encoding-control system might start with a NN 112a allocating bits between a few very large regions 916 of the image at low resolution 914. Given these allocations, another network would be applied independently to each of these large regions. This network takes the bit allocation for a region and further divides that among sub-regions of the current region. A hierarchy of such networks 112a–112b can be constructed, starting at very low resolution 914 or at some intermediate resolution 912, and working up to a network that locates bits at the finest possible spatio-temporal resolution 910 possible for the compression method. The last network in the hierarchy would be applied at the finest resolution 910. For example, in the case of block-based DCT compression such as MPEG2, the coarsest resolution NN 112a might decide on a bit allocation for a frame, the next layer NN 112b might decide on the bit allocation per slice, and the finest resolution layer NN 112c might decide on the bit allocation for each macroblock in a slice. Inputs to these networks at any scale could include the quality metric values for the current sub-regions of the image from a VDM 111, the number of bits, a measure of complexity of the current sub-regions taken from the transform coefficients, etc.

The system described above progresses in resolution from coarse to fine. However, a fine-to-coarse system might also be useful (as illustrated by the doubled arrowed lines between neural networks. A fine-to-coarse system is useful for decisions about coarse level, global encoder parameters, which are a function of localized, fine resolution information. In such cases, fine-resolution information needs to be integrated to make a global decision. An example of this in the context of MPEG2 is the selection of a quantization matrix for a particular frame in a video sequence.

In fact, in order to have both fine-to-coarse and coarse-to-fine decision making, a two-pass NN implementation can be used. Fine-scale information can be passed up from local regions to successively larger regions in order to make globally oriented determinations, and a coarse-to-fine pass can then be performed to make locally oriented decisions and measurements. Furthermore, although only one neural network is illustrated per resolution stage, it should be understood that more than one neural network can be assigned to each resolution stage.

There has thus been shown and described a novel method and apparatus for learning and using fidelity metric as a control mechanism. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. Apparatus for processing a plurality of input signals comprising:

a perceptual metric generator for determining a perceptual metric that represents the fidelity between two of said input signals; and a first neural network, coupled to said perceptual metric generator, for evaluating said perceptual metric to produce a control signal.

2. The apparatus of claim 1, wherein said plurality of input signals are image signals.

3. The apparatus of claim 1, wherein said control signal is used for controlling an encoder having a plurality of encoder parameters.

4. The apparatus of claim 3, wherein said control signal is used for selecting encoder parameters of said encoder.

5. The apparatus of claim 1, wherein said control signal is used to generate fidelity ratings.

6. The apparatus of claim 1, further comprising:

an encoder, coupled to said first neural network, for encoding the plurality of input signals, wherein said control signal is used for selecting encoder parameters of said encoder.

7. The apparatus of claim 1, further comprising:

an encoder, coupled to said first neural network, for encoding the plurality of input signal; and a controller, coupled to said first neural network, for controlling a plurality of encoder parameters of said encoder in response to said control signal of said first neural network.

8. The apparatus of claim 1, wherein each of said input signal is decomposed into a set of varying resolution signals, and wherein said perceptual metric generator determines a perceptual metric between two of said varying resolution signals.

9. The apparatus of claim 8, further comprising a plurality of neural networks, coupled to said first neural network in a hierarchical manner, where each of said neural network evaluates a different perceptual metric generated from different sets of varying resolution signals.

10. Apparatus for processing a plurality of input signals comprising:

a first neural network for determining a perceptual metric that represents the fidelity between two of said input signals;

a second neural network, coupled to said first neural network, for evaluating said perceptual metric to produce a control signal; and an encoder, coupled to said second neural network, for encoding the plurality of input signals, where said control signal is used for selecting encoder parameters of said encoder.

11. Method for processing a plurality of input signals comprising the steps of:

(a) determining a perceptual metric that represents the fidelity between two of said input signals; and (b) using a first neural network to evaluate said perceptual metric to produce a control signal.

12. The method of claim 11, wherein said plurality of input signals are image signals.

13. The method of claim 11, further comprising the step of:

(c) using said control signal to control an encoder having a plurality of encoder parameters.

14. The method of claim 13, wherein said using step (c) uses said control signal to select said encoder parameters of said encoder.

15. The method of claim 11, further comprising the step of:

(c) using said control signal to generate fidelity ratings.

16. The method of claim 11, further comprising the step of:

(c) encoding the plurality of input signals; and (d) using said control signal to control said encoding step (c).

17. The method of claim 11, further comprising the step of:

(c) decomposing each of said input signal into a set of varying resolution signals, and wherein said determining step (a) determines a perceptual metric between two of said varying resolution signals.

18. The method of claim 17, wherein said using step (b) comprises the step of using a plurality of neural networks, where each of said neural network evaluates a different perceptual metric generated from different sets of varying resolution signals.

19. The method of claim 11, further comprising the step of:

(c) decomposing each of said input signal into a set of regions, and wherein said determining step (a) determines a perceptual metric between said regions of two input signals.

* * * * *